(12) United States Patent
Rombold et al.

(10) Patent No.: US 9,051,997 B2
(45) Date of Patent: Jun. 9, 2015

(54) ROLLER-MOUNTED RACK AND PINION DRIVE

(75) Inventors: Manfred Rombold, Winnenden-Hofen (DE); Thomas Lubojatzky, Stuttgart (DE)

(73) Assignee: ThyssenKrupp Presta AG, Eschen (LI)

( * ) Notice: Subject to any disclaimer, the term of this patent is extended or adjusted under 35 U.S.C. 154(b) by 94 days.

(21) Appl. No.: 13/882,788

(22) PCT Filed: Nov. 16, 2011

(86) PCT No.: PCT/EP2011/005763
§ 371 (c)(1),
(2), (4) Date: May 1, 2013

(87) PCT Pub. No.: WO2012/065722
PCT Pub. Date: May 24, 2012

(65) Prior Publication Data
US 2013/0213161 A1    Aug. 22, 2013

(30) Foreign Application Priority Data
Nov. 19, 2010    (DE) .......................... 10 2010 051 728

(51) Int. Cl.
*F16H 19/04*    (2006.01)
*B62D 3/12*    (2006.01)
*F16H 55/28*    (2006.01)

(52) U.S. Cl.
CPC ........... *F16H 19/04* (2013.01); *Y10T 74/18096* (2015.01); *B62D 3/12* (2013.01); *B62D 3/123* (2013.01); *F16H 55/28* (2013.01)

(58) Field of Classification Search
CPC ......... F16H 19/04; F16H 55/26; F16H 55/28; F16H 55/283; F16H 55/285; B62D 3/12; B62D 3/123

USPC ...... 280/93.514; 74/29, 30, 388 PS, 422, 406
See application file for complete search history.

(56) References Cited

U.S. PATENT DOCUMENTS 4,215,591 A * 8/1980 Bishop ............................ 74/422
5,983,742 A    11/1999 Morris et al.

FOREIGN PATENT DOCUMENTS

| EP | 0463891 B1 | 8/1994 |
| GB | 2411874 A | 9/2005 |
| JP | H0181373 U | 5/1989 |

OTHER PUBLICATIONS

International Search Report and Written Opinion issued in PCT/EP2011/005763 dated Feb. 24, 2012 with English translation of Search Report.
International Preliminary Report on Patentability and Written Opinion issued in PCT/EP2011/005763 date of issuance May 21, 2013.

* cited by examiner

*Primary Examiner* — Ruth Ilan
(74) *Attorney, Agent, or Firm* — Panitch Schwarze Belisario & Nadel LLP

(57) ABSTRACT

Rack and pinion drive for a motor vehicle, with a steering housing (1), in which a steering pinion (2) is rotatably mounted and is in engagement with a tooth segment (3) of a toothed rack (4) displaceably mounted in the steering housing (1) in the direction of a longitudinal axis (5), wherein the tooth segment (3) forms an even surface with the upper face thereof facing the steering pinion (2), wherein the toothed rack (4) has two guide surfaces (9), which are even and are oriented at an acute angle to a surface normal of the tooth segment (3), and wherein at least one guide roller (11) is provided on either side of the toothed rack (4), said rollers being in contact with the guide surfaces (9), wherein the two guide rollers (11) are provided respectively on a left and a right side of the pinion when viewed from a toothing engagement point with the toothed rack.

15 Claims, 8 Drawing Sheets

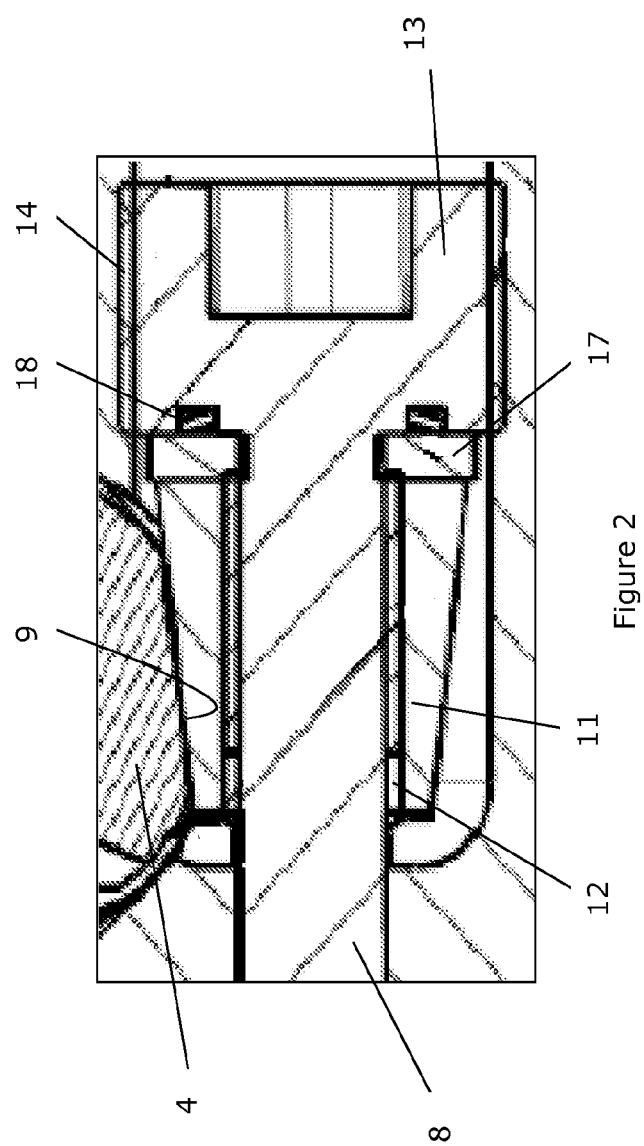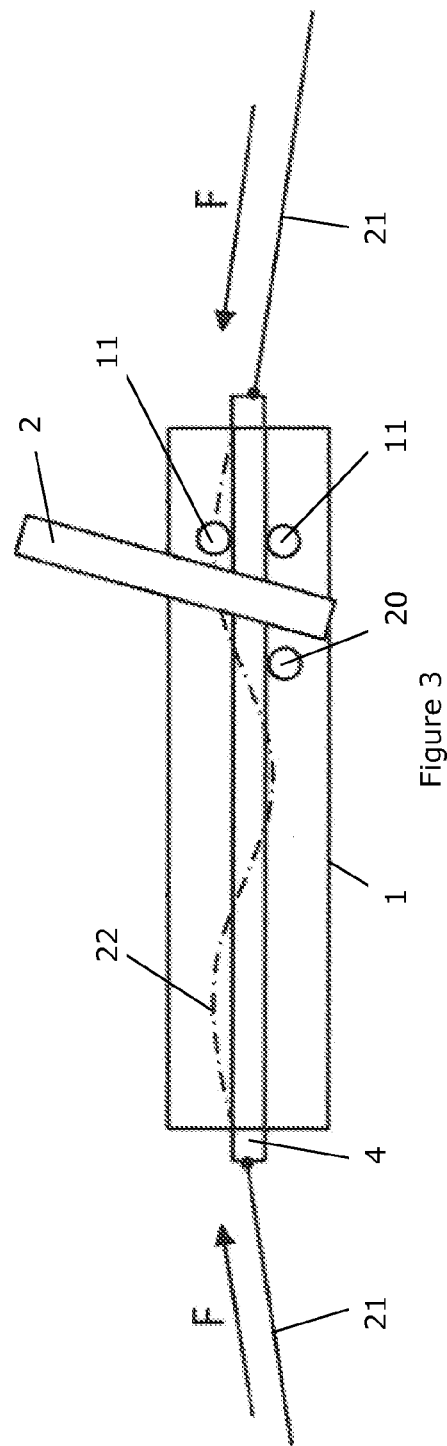

ically supported via spacer discs. The spacer discs can also be provided with spring means which pretension the rollers in an axial direction and consequently said rollers are pushed against the corresponding steering surfaces of the toothed rack.

ROLLER-MOUNTED RACK AND PINION DRIVE

CROSS-REFERENCE TO RELATED APPLICATIONS

This Application is a National Stage of PCT International Application No. PCT/EP2011/005763, filed on Nov. 16, 2011, and claims priority of German Patent Application No. 10 2010 051 728.3, filed on Nov. 19, 2010. The disclosures of the aforementioned applications are incorporated herein in their entirety by reference.

The invention relates to a rack and pinion steering system for motor vehicles.

Rack and pinion steering systems generally comprise a steering housing in which a toothed rack is displaceably mounted in an axial direction lengthwise. The toothed rack has a tooth segment which is in engagement with the teeth of a steering pinion. Steering tie rods are attached at the free ends of the toothed rack and are connected to the steerable steering knuckles and wheels on the respective axis. Forces and torques act on the toothed rack. A torque introduced into the steering pinion by the driver via a steering shaft causes a force to be applied to the toothed rack in an axial direction. This force is then used to pivot the steered wheels. The flanks of the gear teeth further generate a force which acts substantially vertically to the plane of the toothed rack teeth and which pushes both teeth elements apart. The steering tie rods engage with the toothed rack at an angle to the axial direction. Retrospective forces, which act on the steering mechanism from the wheels, then lead to bending momentum which acts on the toothed rack. Finally, torques can also act around the longitudinal axis of the toothed rack which may cause rotation inside the gear teeth.

There are various design solutions for absorbing the unwanted effects of the forces described above. The force occurring perpendicular to the gear teeth plane, which is caused by the engagement of the steering pinion in the tooth segment, is absorbed by a pressure piece which presses the toothed rack against the pinion. Such pressure pieces can be provided with a coating or plating to reduce slipping in order to minimise friction inside the steering mechanism. Solutions are also known in particular from U.S. Pat. No. 5,983,742, for example, in which rollers are used to support the toothed rack. The rollers are arranged with their bearing axle parallel to the plane of the tooth segment. Torques around the longitudinal axis of the toothed rack cannot be absorbed using this arrangement. Triangular or Y-shaped toothed racks are also known. A triangular shaped toothed rack is known from U.S. Pat. No. 4,215,591. Here the toothed rack is pushed into the gear teeth by a roller with a bearing axle oriented parallel to the tooth segment. Torques around the longitudinal axis of the toothed rack are offset by wedge-shaped supporting elements. Said supporting elements create friction in the region of the corresponding bearing surfaces of the toothed rack.

EP 0 463 891 B1 represents the closest prior art. This document discloses a steering system with a Y-shaped toothed rack which is supported in a rear side region facing away from the tooth segment via rollers with bearing axles that are sloping in relation to the surface normals of the tooth segment. The rollers are mounted in supporting elements which are pushed apart via a compression spring. A lever effect is generated in the cylindrical housing, in which the supporting elements are mounted, which pushes the toothed rack into engagement with the steering pinion. Torque support for torques around the longitudinal axis of the toothed rack is not achieved effectively using this arrangement.

None of the aforementioned technical solutions enable the absorption of distortions of the toothed rack by retrospective forces that are not parallel to the axle introduced from the steering tie rods.

The object to be achieved by the present invention is therefore to create a rack and pinion steering system for motor vehicles wherein low-friction guidance of the toothed rack in the region of the toothing engagement enables torque support relative to torques upon the longitudinal axis of the toothed rack and support against bending forces.

This object is achieved by a rack and pinion steering system having the features found in the accompanying claims.

Since the toothed rack has two guide surfaces, which are substantially level and are oriented at an acute angle to the surface normals of the tooth segment, and since guide rollers are provided on both sides of the toothed rack, which are in contact with the guide surfaces, wherein the rotational axes of the guide rollers are oriented on the tooth segment at an angle of 0-20 degrees in relation to the surface normals, the toothed rack is pushed into engagement with the steering pinion. At the same time, a movement of the toothed rack at a right angle to the longitudinal axis is absorbed as it occurs as a result of bending forces. The minimal movements of the toothed rack along its height axis, which occur in particular when the pinion changes its direction of rotation as a result of the flank change of the toothing geometry, are reduced considerably. Due to its height in the direction of the surface normals, the even surfaces of the toothed rack oriented virtually parallel to the surface normals further enable the support of the toothed rack against torques acting upon the longitudinal axis of the toothed rack. This arrangement ensures that the bearing rollers can absorb both the forces occurring in the direction of the surface normals, transverse to said surface normals and to the longitudinal direction, and the torque occurring around the longitudinal axis of the toothed rack without sliding friction. A particularly resilient and low-friction steering of the toothed rack is achieved here. The toothed rack can also be guided in a longitudinal direction at a distance from the toothing engagement and consequently the required available space in the immediate region of the steering pinion is reduced. Furthermore, the steering can be adjusted if the bearing rollers are configured as tapered rollers and the position of the bearing axes can be adjusted. The bearing axes can preferably be positioned in an axial direction via a screw thread wherein the tapered rollers are axially supported via spacer discs. The spacer discs can also be provided with spring means which pretension the rollers in an axial direction and consequently said rollers are pushed against the corresponding steering surfaces of the toothed rack.

Here surface normal means the perpendicular line to an even surface which connects the heads of the individual teeth of the tooth segment to one another.

Preferably three guide rollers are used, wherein two guide rollers are arranged opposite one another and a further guide roller is provided on one side of the toothed rack at a distance relative to the axial direction of the toothed rack. Said three guide rollers can also offset bending forces.

In a further particularly advantageous embodiment, two guide rollers are used, wherein two guide rollers are arranged opposite one another. Here the position of the guide rollers is defined on the basis of the greatest bending strain calculated in tests.

In a further particularly advantageous embodiment, two guide rollers are used in different positions, wherein two guide rollers are arranged opposite one another and wherein the steering pinion is positioned between the rollers.

The absorption of torques, which act upon the longitudinal axis of the toothed rack, is particularly advantageous in two established embodiments of rack and pinion steering systems; firstly in steering systems with a centre take-off in which the tie rods are mounted outside the longitudinal axis, and secondly, in electromagnetic power assisted steering systems, in which the auxiliary force is introduced directly into the toothed rack via a spindle drive. Both embodiments tend to generate appreciable and correspondingly disruptive torques.

Exemplary embodiments of the present invention are described in greater detail below on the basis of the drawings.

FIG. 1 shows a cross-section of a rack and pinion steering system in the region of the guide rollers;

FIG. 2 shows an enlarged diagram of a section from FIG. 1.

FIG. 3 shows a schematic representation of the top view of an embodiment of a rack and pinion steering system with three guide rollers;

FIG. 4 shows a schematic representation of the top view of an embodiment of a rack and pinion steering system with four guide rollers;

FIG. 5 shows a schematic representation of the top view of another embodiment of a rack and pinion steering system with three guide rollers;

FIG. 6 shows a schematic representation of the top view of an embodiment of a rack and pinion steering system with two guide rollers;

FIG. 7 shows a schematic representation of the top view of another embodiment of a rack and pinion steering system with two guide rollers;

FIG. 8 shows a schematic representation of the top view of a third embodiment of a rack and pinion steering system with two guide rollers; and FIG. 9 shows a schematic representation of the top view of a fourth embodiment of a rack and pinion steering system with guide rollers;

Figure 1:
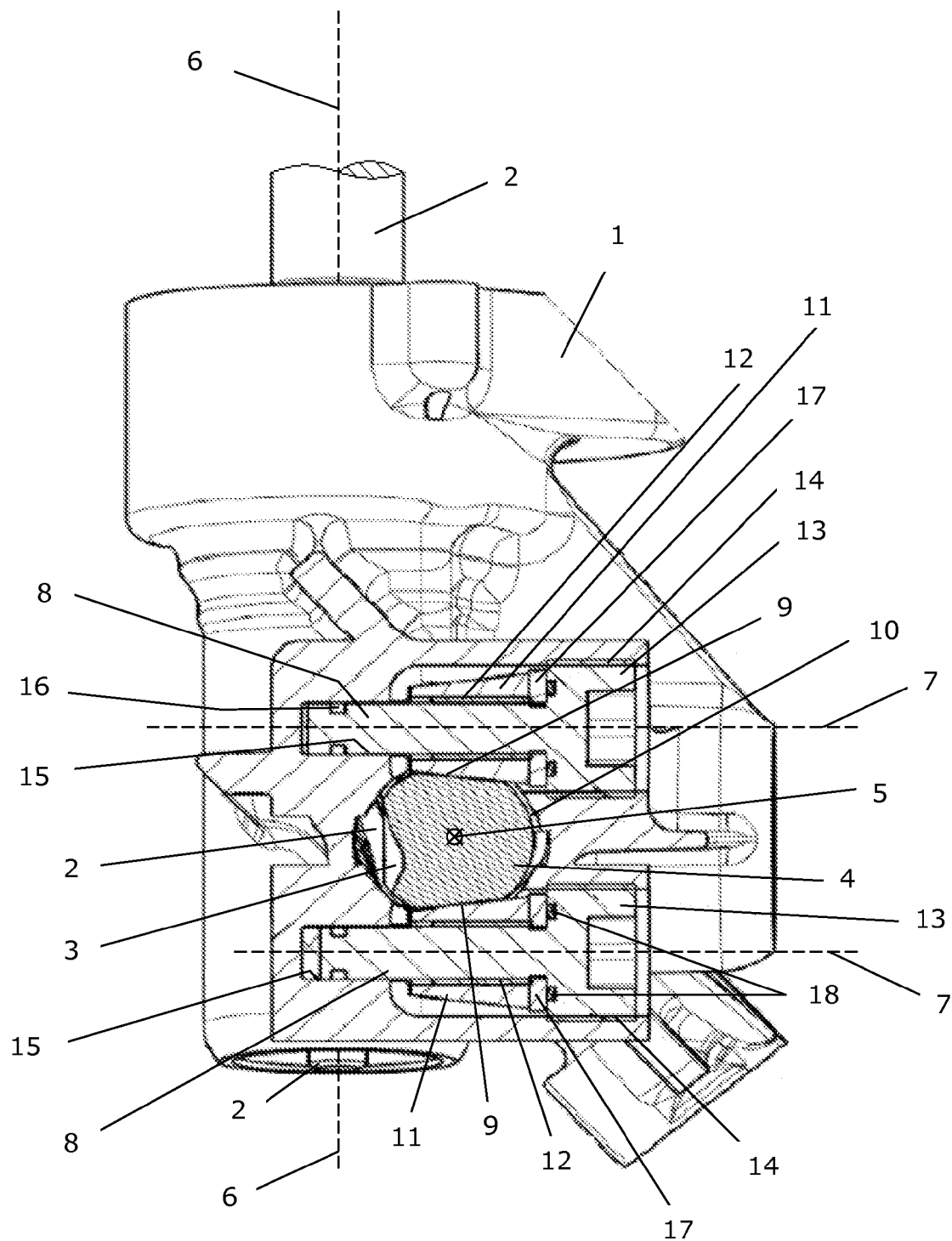
FIG. 1 shows a cross-section of a steering gear with a steering housing 1. A pinion drive shaft 2 is rotatably mounted in the steering housing 1. The pinion drive shaft 2 meshes with a toothed rack 4 in the region of a toothing 3 and the toothed rack 4 is displaceably mounted in the steering housing 1 in the direction of the longitudinal axis 5 which stands perpendicular to the plane of projection. Describing the position of the individual elements in relation to the axes lends itself for the purpose of providing further details. A rotational axis 6 of the steering pinion 2 is shown in addition to the longitudinal axis 5, said rotational axis running in the plane of projection. A longitudinal axis 7 of bearing journals 8 also runs in the plane of projection wherein the longitudinal axis 7 runs perpendicular to the rotational axis 6 and to the longitudinal axis 5.

The toothed rack 4 is provided with the tooth segment 3 in the region shown, said tooth segment being configured in a known manner on the side of the toothed rack facing the steering pinion 2. The tooth segment 3 constitutes a more or less even surface. Proceeding from the tooth segment 3, the toothed rack 4 is provided with two guide surfaces 9 inclined at an acute angle to one another in the direction of the circumference of said toothed rack. Said guide surfaces converge at the junction with the tooth segment 3 like a trapezium. The ends of the guide surfaces 9 facing away from the tooth segment 3 are connected to one another via a curved peripheral region 10. Said peripheral region can also have any other contour. The cross-sectional shape of the toothed rack 4 in said region more or less corresponds to an equal-sided trapezium, in which the parallel sides have been rounded and provided with the tooth segment 3 on one side.

The toothed rack 4 is guided into the region shown firstly through the engagement of the tooth segment 3 with the steering pinion 2, without clearance where possible, and secondly, via two tapered rollers 11 which are in contact with the guide surfaces 9. The tapered rollers 11 are each mounted on a bearing journal 8 via a bearing sleeve 12. The bearing journals 8 are in turn configured as screws with a screw head 13, which is provided with a thread 14 outside and is screwed into the steering housing 1. The bearing journals 8 are inserted into drilled holes 15 in the steering housing at their free ends, substantially without clearance, and are each provided with a sealing ring 16.

The tapered rollers 11 are mounted on the bearing journals 8 by means of the bearing sleeves 12. They guide the toothed rack 4 into the region of the guide surfaces 9. In order to also be able to exert a force on the toothed rack 4 in the direction of the axis 7, which then pushes the toothed rack 4 into engagement with the steering pinion 2, and in order to be able to absorb forces, which push the toothed rack 4 with its tooth segment 3 away from the steering pinion 2, spacer discs 17 are provided in an axial direction between the tapered rollers 11 and the screw heads 13. The spacer discs 17 absorb the forces described. In this exemplary embodiment, the spacer discs 17 are still pretensioned on the tapered rollers 11 by springs 18, each of which lie in a recess of the screw head 13 and push the spacer discs 17 away from the screw head 13 against the tapered rollers 11.

A pressure piece, which, in conventional motor vehicle steering systems, pushes the toothed rack against the steering pinion, is not provided in this steering system.

The toothed rack 4 is brought into engagement with the steering pinion 2 for fitting. The bearing journals 8 are then fitted with the tapered rollers 11 and the spacer discs 17 and inserted into the drilled holes 15. By actuating the screw heads 13, the tapered rollers 11 are then pushed as far against the toothed rack 4 until they are in contact with the guide surfaces 9 without clearance and the engagement of the tooth segment 3 in the steering pinion 2 is also without clearance. The engagement should be such that steering generates little friction. The position of the toothed rack in the direction of the axis 6 can be adjusted by screwing the bearing journals 8 into the corresponding drilled holes to different depths. Depending on the clearance and bearing setting, the screws can be secured against turning using appropriate measures.

An embodiment not shown provides for the bearing of the tapered rollers where plain bearing bushes are arranged in a torque proof manner on the bearing journals 8 and a damping layer, for example an elastomer layer is arranged between the plain bearing bushes and the bearing journals 8, which can absorb the forces acting upon the tapered rollers 11. In this embodiment, the axial spring bias of the tapered rollers 11 described above can be dispensed with. This configuration is also particularly quiet during operation.

In the exemplary embodiment shown, the angle of the surface of the tapered rollers 11 to their axis 7 is approximately 7 degrees. Accordingly, the angle of the guide surfaces 9 to the plane of symmetry of the toothed rack 4 is also selected as 7 degrees. By way of deviation from the strictly geometrical cone shape, the surface of the tapered rollers 11 can also be configured as slightly convex, more precisely the generatrix of the outer surface of the tapered rollers can be convex in shape and consequently, a linear contact of the tapered rollers 11 with the guide surfaces 9 is not created over the whole axial length of the tapered rollers 11. Alternatively, the tapered rollers 11 can be configured in a strictly truncated cone shape whilst the guide surfaces 9, in the region in which the tapered rollers 11 are located, are configured slightly convex in shape. These configurations reduce the overall friction in the steering system which manifests itself in a reduced push-through force of the toothed rack. It also improves the response behaviour and steering feedback from the toothed rack when springing back in the direction of the steering pinion 2. The design of the roller geometry is dependent upon different motor vehicle parameters as well as upon the steering kinematics and the toothing geometry of the pinion/rack connection, and consequently the angle of the outer surface of the tapered rollers 11 can be up to 40 degrees.

The embodiment shown is relatively easy to produce due to the drilled holes 15 configured parallel to one another and other embodiments can make provision that the rotational axes of the tapered rollers 11 are not orientated parallel to one another, but also run at angle which can be between 0 and 20 degrees. The taper angle of the tapered rollers 11 can have different values depending on use. These different values can be between 3 and 40 degrees.

FIG. 2 shows an enlarged diagram of a region around a tapered roller from FIG. 1.

FIG. 3 shows a top schematic view of a steering mechanism. This diagram serves to demonstrate the forces that act upon the steering gear. Only a schematic view is given of the gear housing 1, the steering pinion 2 and the toothed rack 4. The figure shows that the tapered rollers 11 are arranged next to the engagement of the steering pinion 2 in the toothed rack 4. A third tapered roller 20 can be provided relative to the steering pinion 2 opposite the tapered roller 11 in order to create a more rigid design of the bearing.

Schematically shown tie rods 21 are arranged on the ends of the toothed rack 4. Forces acting upon the tie rods 21 are indicated by the letter F. Said forces F cause the toothed rack 4 to bend as demonstrated by the dotted line 22. The bending of the toothed rack 4 whilst the motor vehicle is in operation ranges between several hundredths and a few tenths of millimeters. The tapered rollers 11 and 20 are provided for this purpose and are suitable for absorbing such bends particularly well, keeping overall friction in the steering gear to a minimum.

Figure 4:
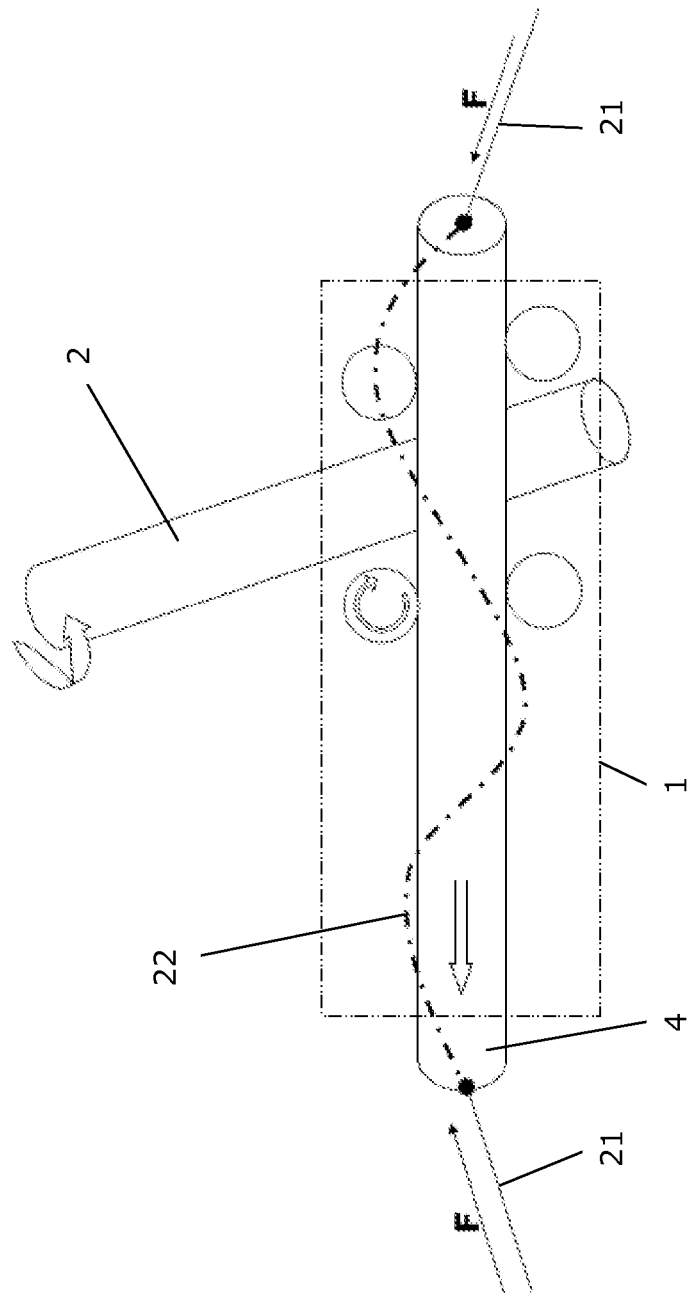

FIG. 4 shows a schematic representation of the top view of an embodiment of a rack and pinion steering system with four guide rollers. This configuration enables particularly rigid guidance of the toothed rack 4.

Figure 5:
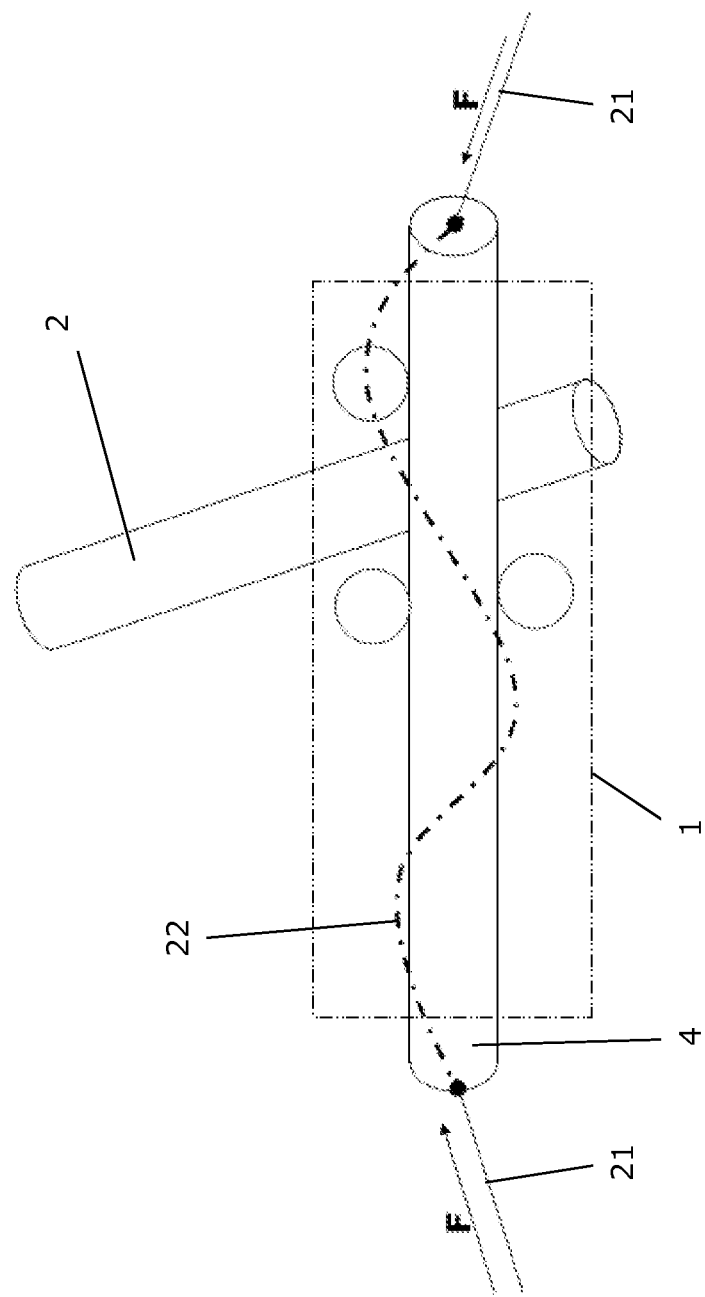

FIG. 5 shows a schematic representation of the top view of another embodiment of a rack and pinion steering system with three guide rollers. This configuration enables guidance of the in the region of the deviations to be expected in the case of certain axis geometries [sic].

Figure 6:
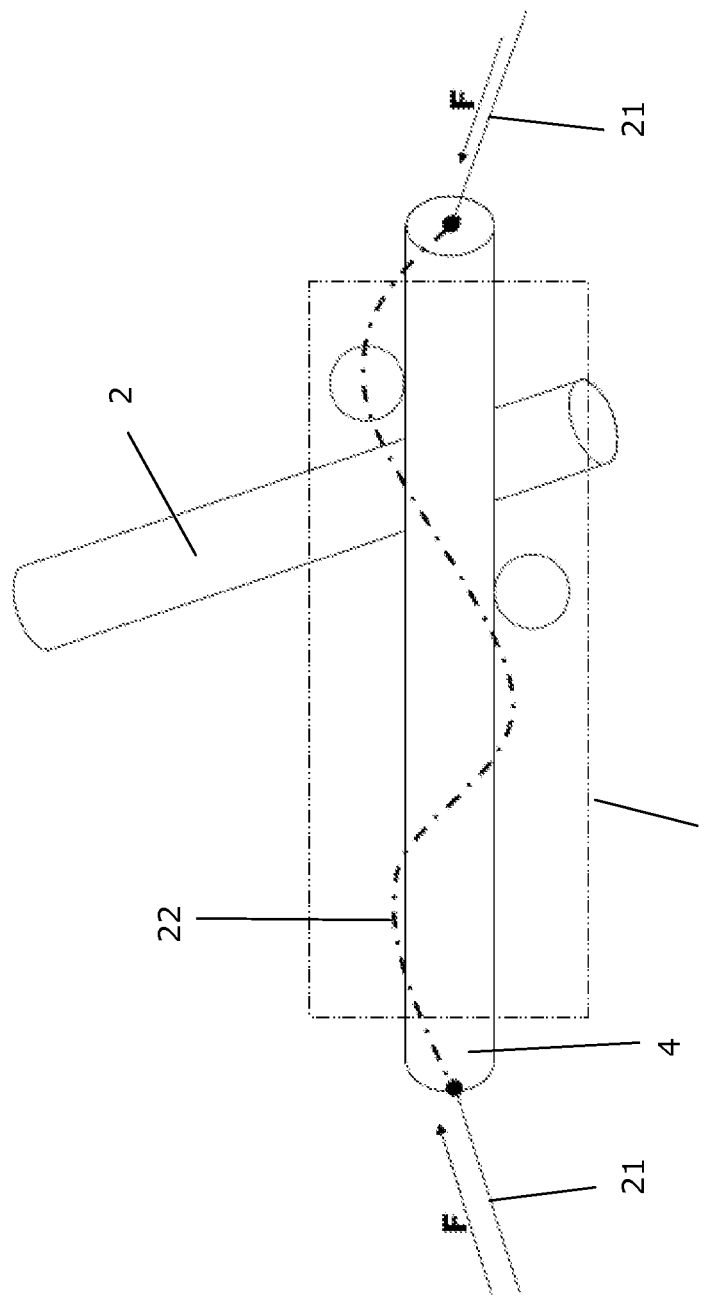

FIG. 6 shows a schematic representation of the top view of an embodiment of a rack and pinion steering system with two guide rollers. This configuration enables particularly low-friction guidance of the toothed rack 4.

Figure 7:
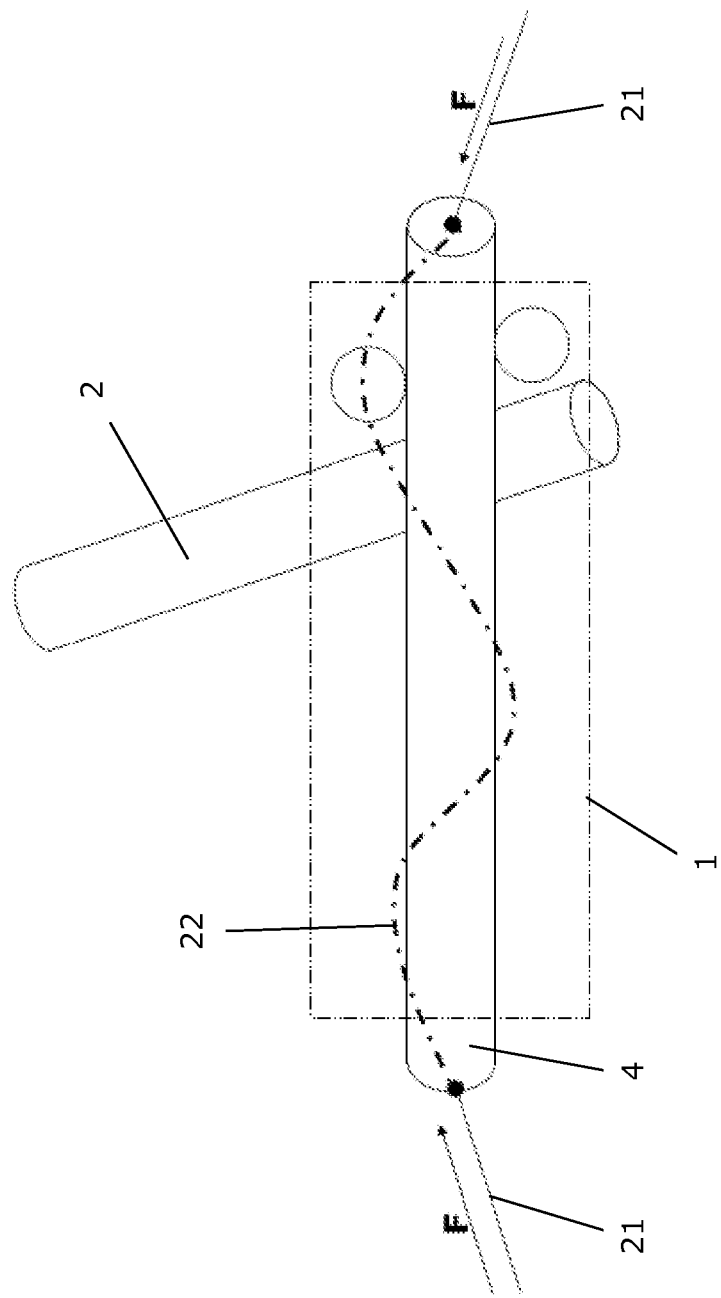

FIG. 7 shows a schematic representation of the top view of a fourth embodiment of a rack and pinion steering system with guide rollers. This configuration enables particularly low-friction guidance of the toothed rack 4 in the region of the free end of the steering housing.

Figure 8:
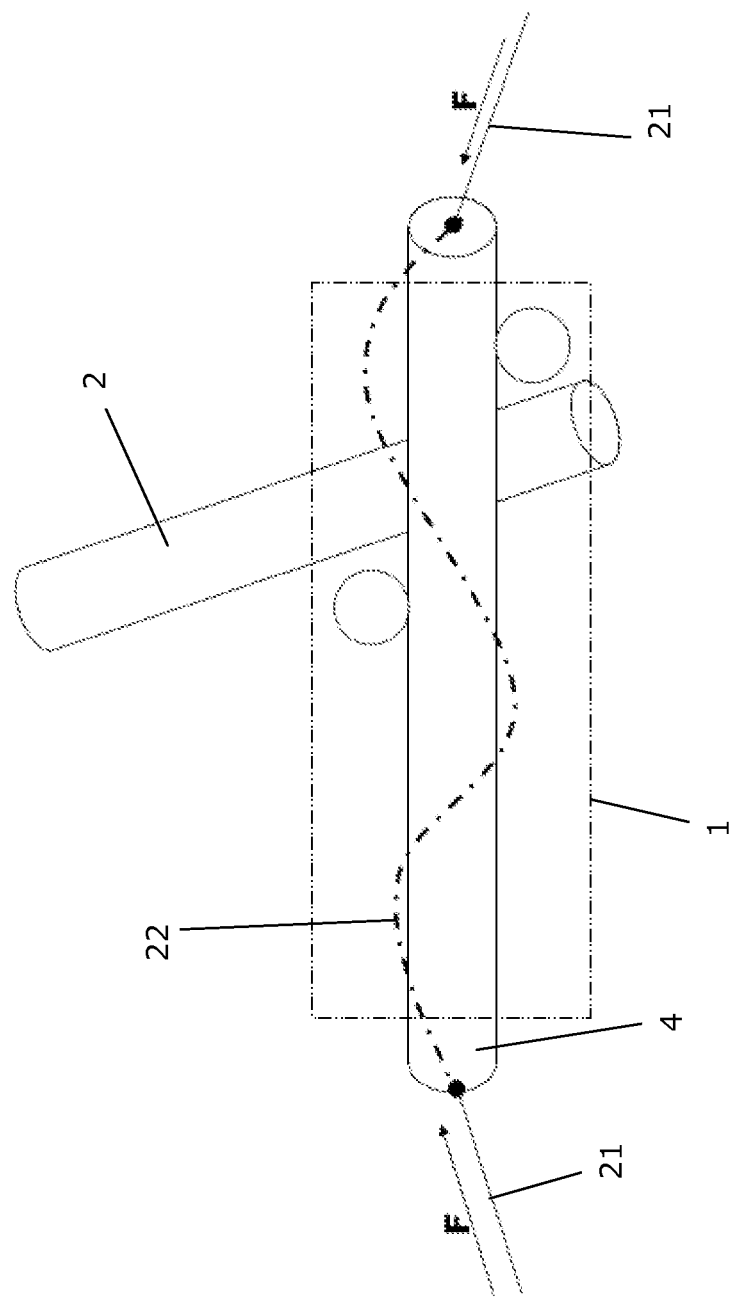

FIG. 8 shows a schematic representation of the top view of a fourth embodiment of a rack and pinion steering system with guide rollers. This configuration enables particularly low-friction guidance of the toothed rack 4 and adjustment to limited available space.

Figure 9:
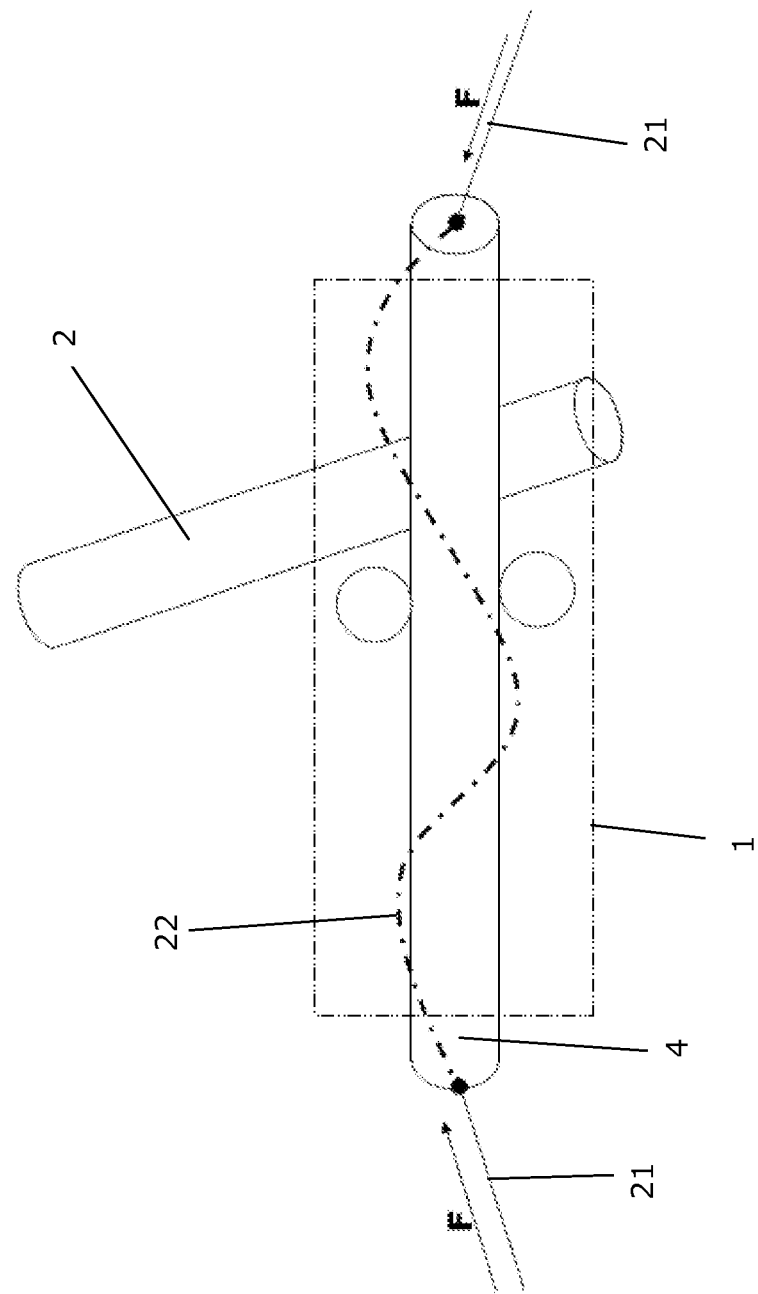

FIG. 9 shows a schematic representation of the top view of a fourth embodiment of a rack and pinion steering system with guide rollers. This configuration enables particularly rigid guidance of the toothed rack 4. This configuration enables particularly low-friction guidance of the toothed rack 4 in the case of further adjustment to limited available space in the region of the free end of the steering housing.

What is claimed is:

1. A rack and pinion drive for a motor vehicle, including:
a steering housing having a steering pinion rotatably mounted and in engagement with a tooth segment of a toothed rack displaceably mounted in the steering housing in the direction of a longitudinal axis of the steering housing,
wherein the tooth segment forms an even surface with an upper face thereof facing the steering pinion,
wherein the toothed rack has two guide surfaces, which are even and are oriented at an acute angle to a surface normal of the tooth segment,
wherein at least one guide roller is provided on each side of the toothed rack, said guide rollers being in contact with the guide surfaces,
wherein the two guide rollers are provided respectively on a left and a right side of the steering pinion when viewed from a toothing engagement point with the toothed rack, and
wherein rotational axes of the guide rollers are oriented at an angle of between 0° and 20° in relation to the surface normal.

2. The rack and pinion drive according to claim 1, further including a further guide roller is provided on a left and/or a right side opposite a respective guide roller.

3. The rack and pinion drive according to claim 1, wherein the toothed rack is guided into the guide rollers in the direction of longitudinal axis of the toothed rack at a distance from the toothing engagement.

4. The rack and pinion drive according to claim 1, wherein the guide rollers are configured as tapered rollers.

5. The rack and pinion drive according to claim 4, wherein a generatrix of the outer surface of the tapered rollers is convex.

6. The rack and pinion drive according to claim 4, and wherein the taper angle of the tapered rollers is oriented at between 3 and 40 degrees.

7. The rack and pinion drive according to claim 4, wherein the tapered rollers are supported axially via spacer discs.

8. The rack and pinion drive according to claim 7, wherein the spacer discs are configured as cup springs.

9. The rack and pinion drive according to claim 7, wherein the spacer discs are provided with spring means configured to pretension the guide rollers in an axial direction.

10. The rack and pinion drive according to claim 1, wherein the bearing axes of the guide rollers are formed by bearing journals, and wherein their positions can be adjusted.

11. The rack and pinion drive according to claim 10, wherein the bearing journals can be positioned in an axial direction via a screw thread.

12. The rack and pinion drive according to claim 1, wherein three guide rollers are provided, wherein two guide rollers are arranged opposite each other relative to the toothed rack, and wherein a further guide roller is provided on one side of the toothed rack at a distance from the two guide rollers relative to the axial direction of the toothed rack.

13. The rack and pinion drive according to claim 12, wherein the steering pinion is arranged between the two guide rollers and the further guide roller.

14. The rack and pinion drive according to claim 1, wherein the steering pinion is arranged between the guide rollers.

15. The rack and pinion drive according to claim 1, wherein a surface of the guide surfaces in relation to the contact surface between guide surface and the peripheral surface of the roller is convex.

* * * * *